United States Patent [19]

Dussud

[11] 4,303,279
[45] Dec. 1, 1981

[54] INSTALLATION FOR HANDLING BY TABLE WITH BEARING BALLS

[76] Inventor: Jean-Benoit Dussud, 12, rue Champ Rochas, 38240 Meylan, France

[21] Appl. No.: 96,915

[22] Filed: Nov. 23, 1979

[30] Foreign Application Priority Data

Dec. 4, 1978 [FR] France .............................. 78 34102

[51] Int. Cl.³ ............................................ F16C 29/06
[52] U.S. Cl. ............................. 308/6 C; 193/35 MD
[58] Field of Search ............ 308/6 C, 6 R, 3 R, 3 A, 308/3 C, 1 R; 209/695; 193/35 MD

[56] References Cited

U.S. PATENT DOCUMENTS

| 3,020,993 | 2/1962 | Heinrich et al. | 193/35 MD |
| 3,682,284 | 8/1972 | Sakamoto | 193/35 MD |

*Primary Examiner*—William D. Martin, Jr.
*Attorney, Agent, or Firm*—Holtz, Goodman & Woodward Frishauf

[57] ABSTRACT

Installation for handling by table with bearing balls. On the table 1 bearing balls 2 which support the load C roll freely. An apparatus 3 to 20 allows the bearing balls 2 which leave the table to be returned to it.

4 Claims, 3 Drawing Figures

INSTALLATION FOR HANDLING BY TABLE WITH BEARING BALLS

The present invention concerns installations for handling or moving loads or for making them pivot.

A track with free balls for handling loads is described in French Pat. No. 1 559 673. This track is not suitable for handling large loads or for making them turn. Widening of the track is not a possibility because it is its narrowness which enables it to be correctly refilled with bearing balls.

The invention remedies this disadvantage with an installation allowing the provision of a large-sized table with bearing balls on which the bearing balls returned disperse randomly.

Consequently the object of the invention is an installation for handling a load, comprising a table, on which the bearing balls roll freely and which is bordered by a trough, and apparatuses for returning to the table bearing balls which fall into the trough, characterised in that the trough extends over at least two edges of the table and by a distributor between the apparatuses for returning bearing balls which fall into the trough.

Thanks to this distributor, no area of the table progressively loses bearing balls as the table is in operation and the balls fall into the trough at one side of the table.

Distribution is improved if the table is square and surrounded by the trough and if there are as many return apparatuses as sides to the table, that is, four return apparatuses, one for each edge.

According to one simple and practical embodiment, the distributor is a cone with its apex directed upwards and with the extension of its axis passing through the point at which the diagonals of the table intersect.

As the trough extends below the plane in which the object to be handled extends and as the chimney for returning the bearing balls does not prevent movement of the object, it is possible to mount several installations according to the invention side by side to form an installation for handling over long distances, especially if the width, calculated in the plane of the table, of the trough and one apparatus for returning bearing balls is slightly more than twice the diameter of the bearing balls.

In the attached drawings, given solely by way of example:

Figure 1:
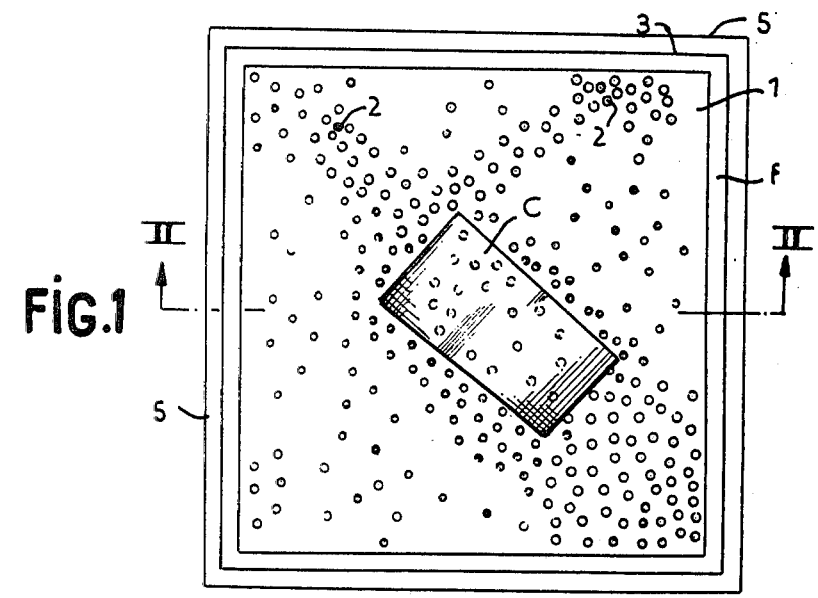
FIG. 1 is a view from above of one handling element according to the invention.
Figure 3:
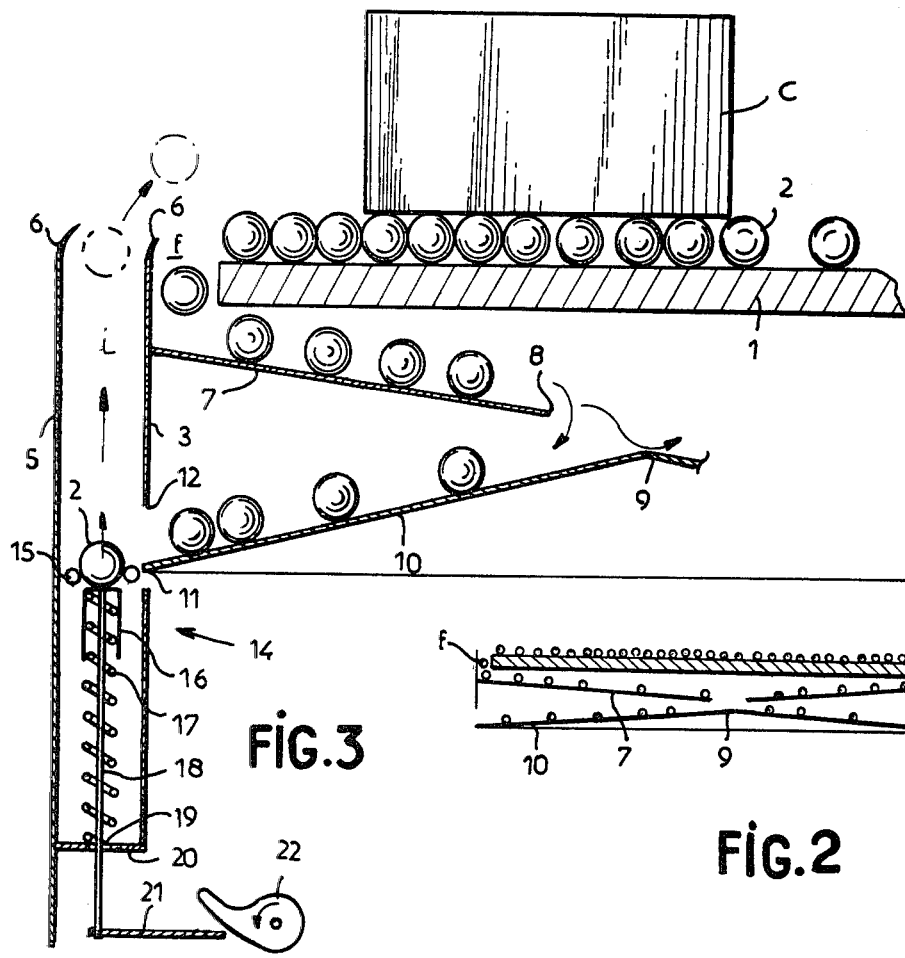
FIG. 3 is a view in section of one edge of the table according to the invention.
Figure 2:
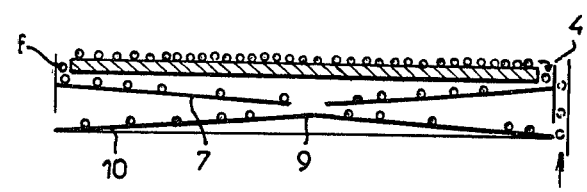
FIG. 2 is a view in section at the line II—II of FIG. 1.

To transport a load C and change its direction of advance, a square table, flat, and horizontal, of hard plate is provided, on which rolls a bed of bearing balls 2 of steel with the same diameter.

At a distance from the periphery of the table slightly greater than the diameter of the bearing balls 2, four walls 3, padded on two sides to prevent noise, are mounted fixedly to a framework which is not represented. The upper edges 4 of these walls 3 are lower than the tops of the bearing balls 2. With the sides of the table 1, they form a trough f. At a distance from these walls 3 slightly greater than the diameter of the bearing balls, four padded walls 5 are mounted with their sides turned towards the walls 3. The upper edges of the walls 3 and 5 are on the same level and end in a deflector 6.

From walls 3, at a lower level than that of the lower face of the table 1, starts a hollow rolling frustrum of a cone 7 whose small base 8, turned downwards and larger than the diameter of one bearing ball 2, opens above the apex 9 of a cone 10. The apex 9 is turned upwards and the extension of the axis of the cone 10 passes through the point at which the diagonals of the table 1 intersect. The cone 10 is fixed to the framework.

The large base 11 of the cone 10 extends as far as four apertures 12, larger than the bearing balls 2, provided at the bottom of the walls 3. The apertures 12 open into the space or spaces i formed between the walls 3 and 5.

A catapult 14, like those in pinball games, is provided at the bottom of each space i respectively. The catapult essentially comprises two abutments 15 determining the position of a bearing ball 2 which is to be catapulted and a driver 16 able to pass between the two abutments 15 and capping a spring 7 wound spirally around the rod 18 of the driver. The end 19 of the spring 17 opposite the abutments 15 rests on the bottom 20 and is cranked with a finger 21 moved by a cam 22 so as to compress the spring 17 and then release it.

The bearing ball 2 catapulted by the catapult 14 rises up the chimney i and, deflected by the deflector 6, comes back onto the table 1.

What is claimed is:

1. Installation for handling a load comprising:
    a table,
    bearing balls which roll freely on the table,
    a trough which extends along at least two edges of the table, and a distributor on which said trough opens downwards for distributing bearing balls which have fallen from the table into the trough said distributor being under the table, and
    means for receiving the balls from the distributor and for returning them to the table.

2. The installation of claim 1, wherein the distributor is a cone with its apex directed upwards and with the extension of its axis passing through the point at which the diagonals of the table intersect.

3. The installation of claim 1, wherein the table is square and wherein said returning means comprise four devices, one for each edge.

4. The installation of claim 3, wherein the table is square and wherein said returning means comprise four devices, one for each edge.

* * * * *